US011978368B2

(12) United States Patent
Humbles

(10) Patent No.: US 11,978,368 B2
(45) Date of Patent: May 7, 2024

(54) MAGNETIZED DECORATIVE FENCE ASSEMBLY

(71) Applicant: Jeffrey Humbles, Indianapolis, IN (US)

(72) Inventor: Jeffrey Humbles, Indianapolis, IN (US)

( * ) Notice: Subject to any disclaimer, the term of this patent is extended or adjusted under 35 U.S.C. 154(b) by 72 days.

(21) Appl. No.: 17/725,269

(22) Filed: Apr. 20, 2022

(65) Prior Publication Data

US 2023/0343246 A1 Oct. 26, 2023

(51) Int. Cl.
*G09F 7/18* (2006.01)
*G09F 19/22* (2006.01)

(52) U.S. Cl.
CPC ................ *G09F 7/18* (2013.01); *G09F 19/22* (2013.01); *G09F 2007/1804* (2013.01); *G09F 2007/1834* (2013.01); *G09F 2007/1843* (2013.01); *G09F 2007/1852* (2013.01); *G09F 2007/1856* (2013.01); *G09F 2007/1873* (2013.01)

(58) Field of Classification Search
CPC ..... G09F 2007/1873; G09F 2007/1856; G09F 2007/1852; G09F 2007/1843; G09F 2007/1834; G09F 2007/1804; G09F 7/18; E06B 9/60; E06B 9/08; E06B 9/78; E06B 3/4636; E01F 13/028
See application file for complete search history.

(56) References Cited

U.S. PATENT DOCUMENTS 5,184,684 A * 2/1993 Kohlman ............... A62C 13/78 169/51
5,188,332 A * 2/1993 Callas ....................... G09F 7/18 248/340
5,671,913 A 9/1997 Vesper
5,680,893 A 10/1997 Neer
6,059,007 A * 5/2000 Tomita ...................... E06B 9/54 160/264
D758,611 S 6/2016 Knudsen
10,100,574 B2 * 10/2018 Reiner ...................... E06B 9/18
10,435,855 B1 * 10/2019 Cohen ................... E01F 13/022
2006/0151123 A1 * 7/2006 Chandler .................. E06B 9/08 160/24
2007/0090334 A1 4/2007 Laws
2009/0008042 A1 * 1/2009 Snyder ...................... E06B 9/08 160/264
2012/0103541 A1 * 5/2012 Maxwell ............. E04F 11/1861 160/24
2018/0322815 A1 * 11/2018 White ....................... G09F 7/18
2019/0316306 A1 * 10/2019 Llobet ................... E01F 13/028
2020/0071948 A1 * 3/2020 Crawley ................. E04H 12/22

FOREIGN PATENT DOCUMENTS

WO WO2007047968 4/2007

* cited by examiner

*Primary Examiner* — David R Dunn
*Assistant Examiner* — Christopher E Veraa

(57) ABSTRACT

A magnetized decorative fence assembly for providing decorative fencing includes a plurality of magnets of a fence post. The plurality of magnets of the fence post engages by magnetism to a plurality of magnets of a housing. An interior of the housing holds a fence roll. An end of the fence roll is positioned in an opening of the housing. The fence roll is pulled out of the housing to display a surface having a variety of decorative illustrations. A bar coupled to the end of the fence roll has a plurality of hooks used to retain the end of the fence roll to a plurality of screws of the fence post. The plurality of hooks can be latched or unlatched to the plurality of screws.

11 Claims, 6 Drawing Sheets

MAGNETIZED DECORATIVE FENCE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to retractable screen apparatuses and more particularly pertains to a new retractable screen apparatus for providing decorative fencing.

(2) Description of Related Art Including Information Disclosed Under 37 CFR 1.97 and 1.98

The prior art relates to retractable screen apparatuses. Known prior art includes a variety of retractable screen apparatuses used for a yard of a house. Furthermore, known prior art includes a variety of retractable screen apparatuses being contained within a housing structure when in a closed position. Known prior art lacks a retractable screen apparatus having fencing with a variety of decorative illustrations and attaching to a fence post by a plurality of magnets.

BRIEF SUMMARY OF THE INVENTION

An embodiment of the disclosure meets the needs presented above by generally comprising a plurality of magnets. Each of the magnets has a center with a hole. The hole is configured for holding a screw used to retain each of the magnets to a fence post. A housing having a plurality of walls has a plurality of magnets. The plurality of magnets of the housing is configured for engaging by magnetism to the plurality of magnets of the fence post. Furthermore, an end of a fence roll is configured for being pulled out from the housing whereby exposed a surface of the fence roll. The surface of the fence roll has a variety of decorative illustrations. A bar is coupled to the end of the fence roll and has a plurality of hooks. The plurality of hooks is configured for latching to a plurality of screws of the fence post.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
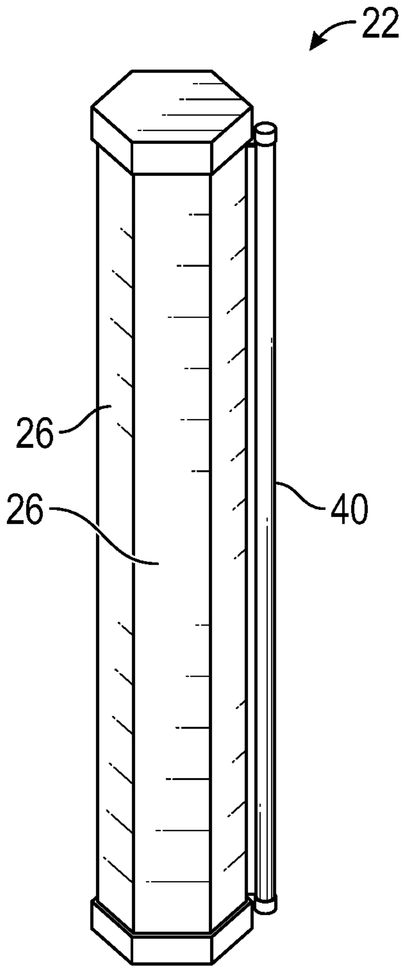
FIG. 1 is a front view of a magnetized decorative fence assembly according to an embodiment of the disclosure.
Figure 2:
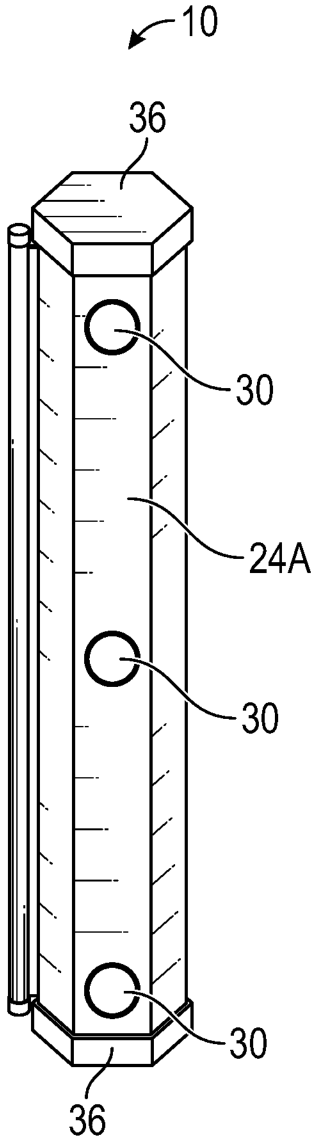
FIG. 2 is a back view of an embodiment of the disclosure.
Figure 3:
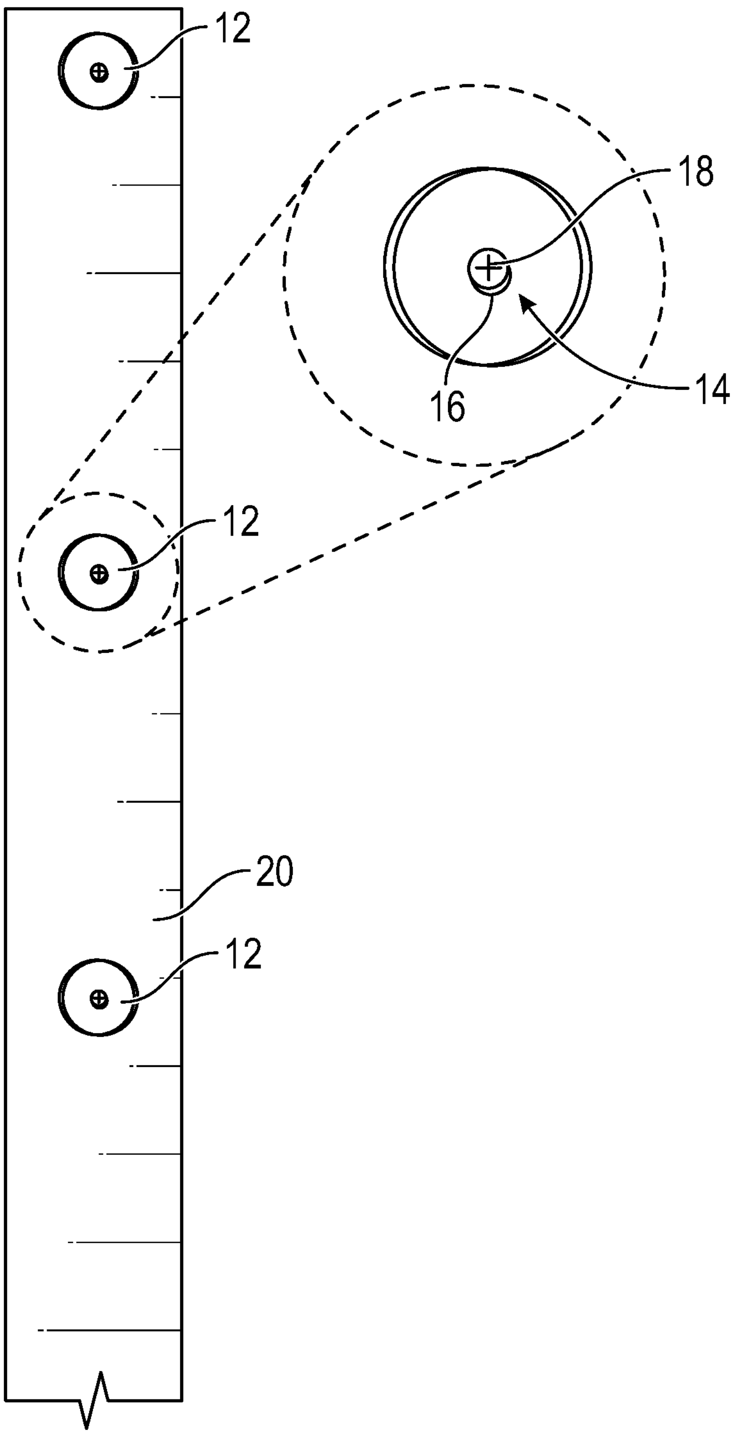
FIG. 3 is a detail view of an embodiment of the disclosure of the fence post.
Figure 4:
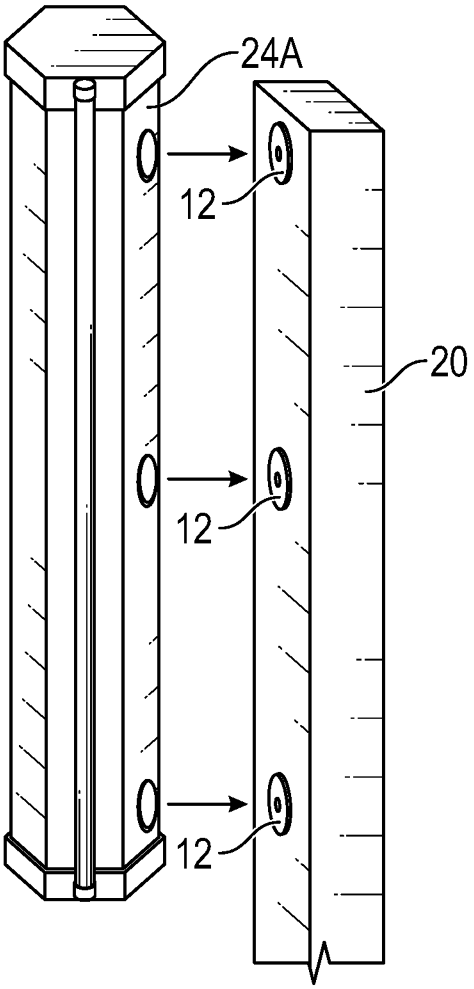
FIG. 4 is a perspective view of an embodiment of the disclosure.
Figure 5:
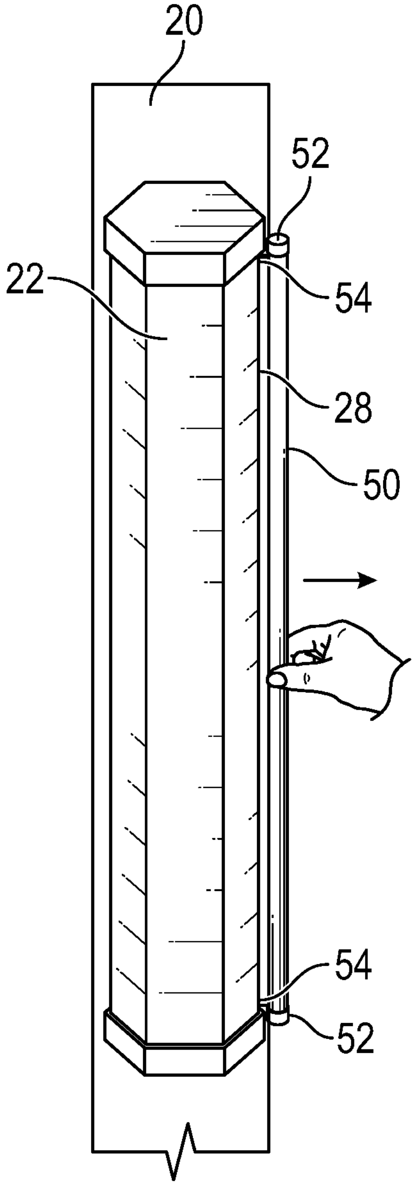
FIG. 5 is an in-use view of an embodiment of the disclosure.
Figure 6:
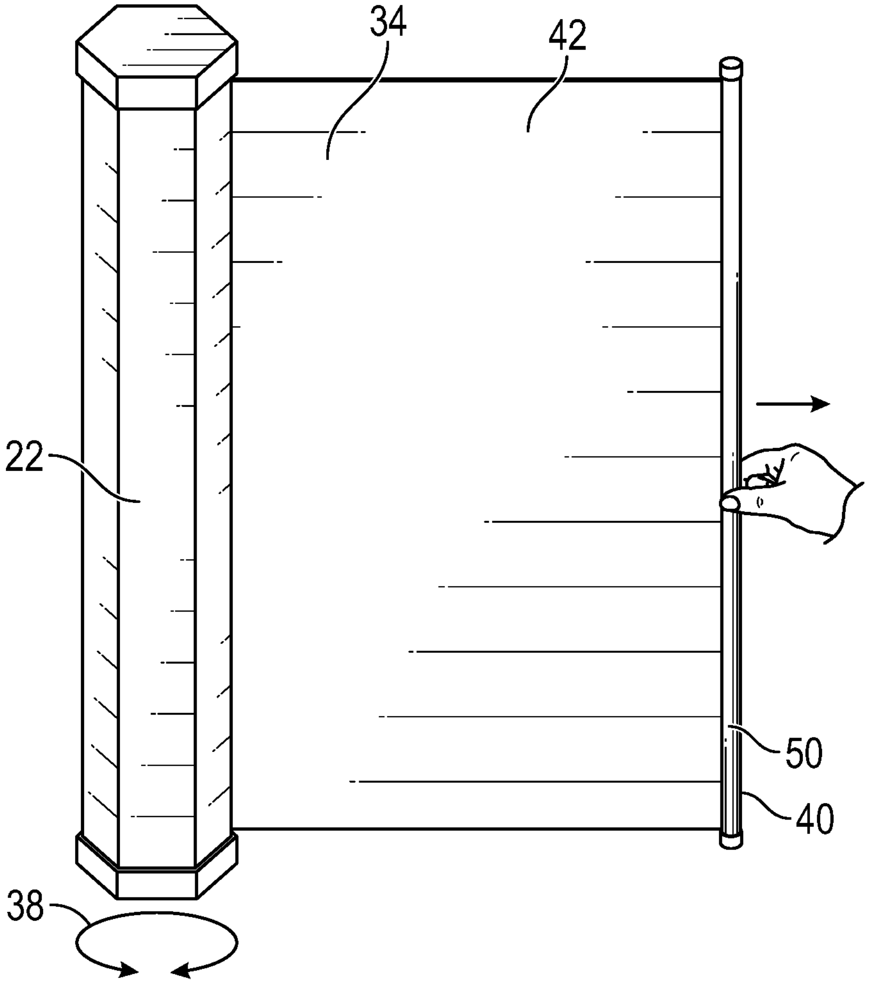
FIG. 6 is an in-use view of an embodiment of the disclosure.
Figure 7:
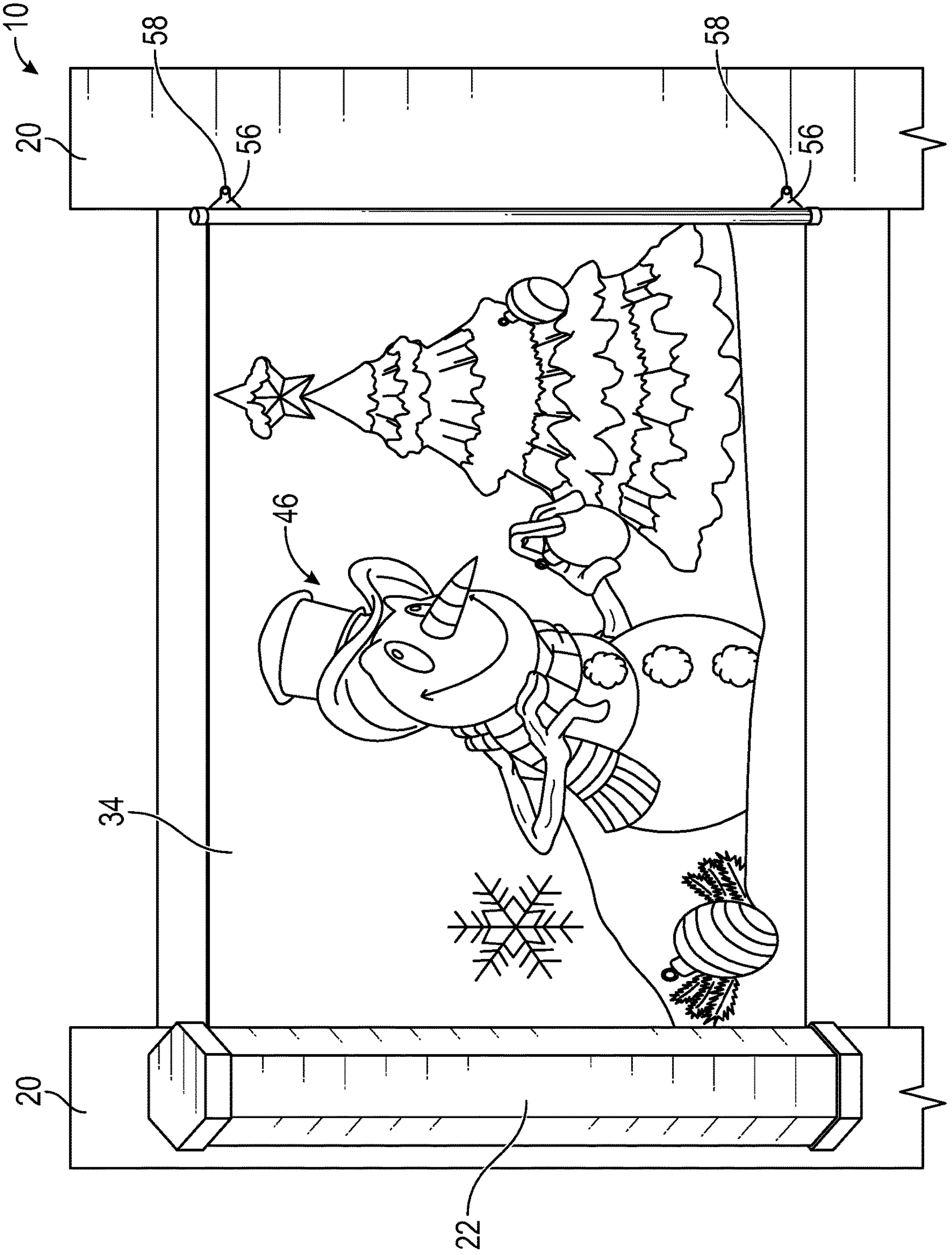
FIG. 7 is an in-use view of an embodiment of the disclosure.
Figure 8:
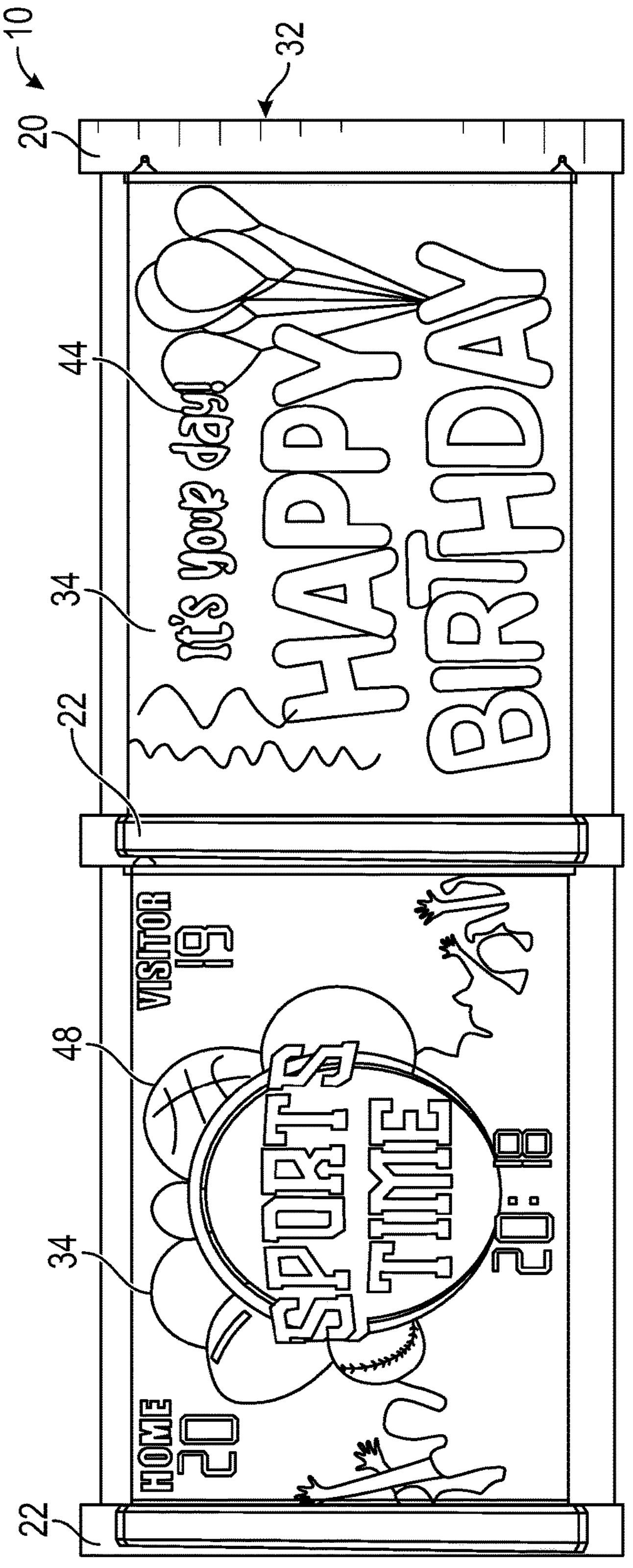
FIG. 8 is an in-use view of an embodiment of the disclosure.
Figure 9:
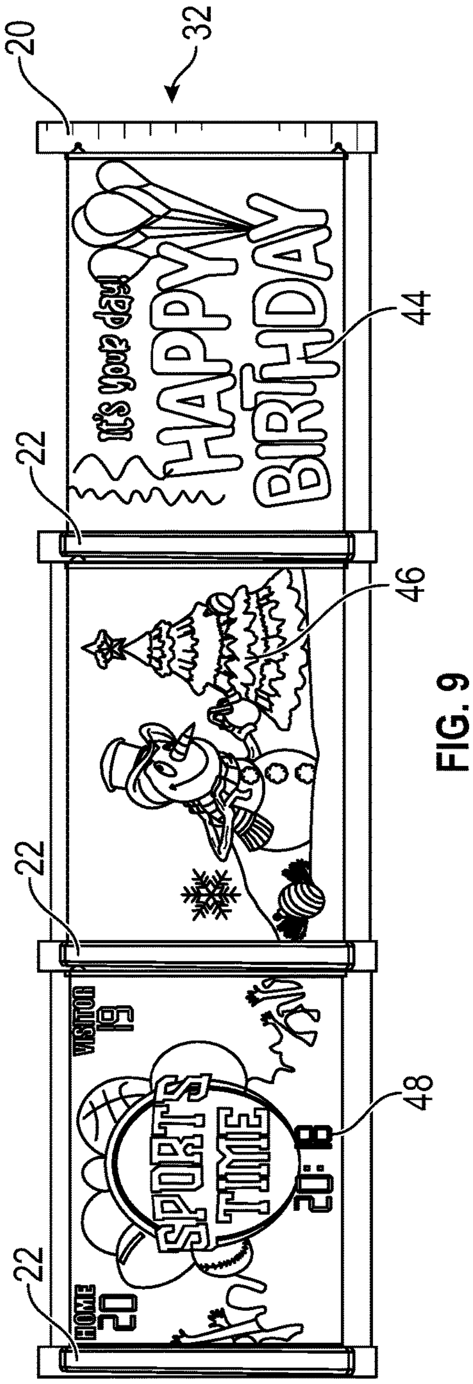
FIG. 9 is an in-use view of an embodiment of the disclosure.

With reference now to the drawings, and in particular to FIGS. 1 through 9 thereof, a new retractable screen apparatus embodying the principles and concepts of an embodiment of the disclosure and generally designated by the reference numeral 10 will be described.

As best illustrated in FIGS. 1 through 9, the magnetized decorative fence assembly 10 generally comprises a plurality of magnets 12. Each of the magnets 12 has a magnetic pull that can attract other magnets. Each of the magnets 12 is circular and has a center 14. In the center 14 of each of the magnets 12 is a hole 16 where a screw 18 can be inserted through. The screw 18 of each of the magnets 12 is used to retain each of the magnets 12 to a fence post 20. The screws 18 of each of the magnets 12 can be removed to move each of the magnets 12.

A housing 22 has a plurality of walls 24 in a hexagon shape 26 as shown in FIG. 1. The hexagon shape 26 of the plurality of walls 24 defines an interior within the housing 22. The interior is configured to hold a variety of elements of the magnetized decorative fence assembly 10. Furthermore, the housing 22 has an opening 28 configured for providing access to the interior of the housing 22. A wall 24A of the plurality of walls 24 has a plurality of magnets 30 similar to the plurality of magnets 12 of the fence post 20.

The plurality of magnets 30 of the housing 22 is configured for engaging by magnetism to the plurality of magnets 12 of the fence post 20, whereby retaining the housing 22 to the fence post 20.

Positioned within the interior of the housing 22 is a fence roll 34. The fence roll 34 is a rectangular fencing enwrapped in a center of the housing 22. The fence roll 34 has a flexible material configured for facilitating the winding about the center of the housing 22. The center of the housing 22 is a pole retained in place by a pair of caps 36 of the housing. The pole has a retractable mechanism 38 that comprises a spring. The retractable mechanism 38 is configured for retaining the fence roll 34 within the housing 22 when not in-use. An end 40 of the fence roll 34 is configured being pulled out from the opening 28 housing when in-use. By pulling out the end 40 of the fence roll 34 from the opening 28 of the housing 22, a surface 42 of the fence roll 34 is exposed. The surface 42 of the fence roll 34 is configured for having a variety of decorative illustrations 32.

The variety of decorative illustrations 32 of the fence roll 34 can include birthday illustrations 44, Christmas illustrations 46, sport illustrations 48, and other illustrations designed by the user. A bar 50 is coupled to the end 40 of the fence roll 34 which provides an area for the user to grasp and pull out the end 40 of the fence roll 34 from the opening 40 of the housing 22. The ends 52 of the bar 50 extended out from the end 40 of the fence roll 34 beyond the ends 54 of the opening 28 of the housing 22 to obstruct the end 40 of the fence roll 34 from being tugged into the interior of the housing 22 due to the retractable mechanism 38. The bar 50 has a plurality of hooks 56 configured for latching to a plurality of screws 58 inserted into the fence post 20. The plurality of hooks 56 helps to retain the fence roll 34 in an open position when in-use.

In use, the plurality of magnets 12 is drilled into the fence post 20 using the screws 18 of each of the magnets 12. Subsequently, the plurality of magnets 30 of the housing 22 is retained to the plurality of magnets 12 of the fence post 20 by the magnetic pull of each of the magnets 12. When the housing 22 is retained to the fence post 20, the user grabs the bar 50 of the end 40 of the fence roll 34 and pulls the bar 50 out and away from the opening 28 of the housing 22. The fence roll 34 is unraveled from the interior of the housing 22 as the end 40 of the fence roll 34 is pulled away from the housing 22. The plurality of hooks 56 of the bar 50 can be latched on to the plurality of screws 58 that can be drilled into the fence post 20. When the plurality of hooks 56 is latched to the plurality of screws 58, the surface 42 of the fence roll 34 will be on display. To undo the fence roll 34, the user unlatches the plurality of hooks 56 from the fence post 20 and the retractable mechanism 38 within the interior of the housing 22 will pull the end 40 of the fence roll 34 back to the opening 28 of the housing 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnetized decorative fence assembly comprising: a plurality of post magnets linearly arranged along a length of a fence post, each of said post magnets having a center, said center of each of said post magnets having a hole, said hole being configured for holding a screw, said screw being configured for retaining each of said post magnets to the fence post;

a housing, said housing having a plurality of walls;

a plurality of housing magnets, said plurality of housing magnets being linearly arranged along a length a wall of said plurality of walls such that each of said housing magnets has an outward face exposed on the wall of the plurality of walls, said plurality of housing magnets being configured for engaging by magnetism to said plurality of post magnets of said fence post;

a fence roll, said fence roll having an end, said end of said fence roll being configured for being pulled out from said housing through a second wall of said plurality of walls wherein the second wall is adjacent to the wall into which the plurality of housing magnets is inset, said surface of said fence roll having a variety of decorative illustrations; and a bar, said bar being coupled to said end of said fence roll, said bar having a plurality of hooks, said plurality of hooks being configured for latching to a plurality of screws of said fence post.

2. The magnetized decorative fence assembly of claim 1, further comprising each of said post magnets and said housing magnets being circular.

3. The magnetized decorative fence assembly of claim 1, further comprising said plurality of walls being in a hexagon shape.

4. The magnetized decorative fence assembly of claim 3, further comprising said hexagon shape of said plurality of walls defining an interior, said interior being configured for holding a variety of elements.

5. The magnetized decorative fence assembly of claim 4, further comprising said housing having an opening, said opening being configured for providing access to said interior of said housing.

6. The magnetized decorative fence assembly of claim 1, further comprising said fence roll being a rectangular fencing enwrapped in a center of said housing.

7. The magnetized decorative fence assembly of claim 6, further comprising said center of said housing being a pole having a spring, said spring being a retractable mechanism, said retractable mechanism being configured for retracting said fence roll within said interior of said housing.

8. The magnetized decorative fence assembly of claim 1, further comprising said bar being a cylindrical shape.

9. The magnetized decorative fence assembly of claim 5, further comprising said bar being positioned in said opening of said housing when in a closed position.

10. The magnetized decorative fence assembly of claim 1, further comprising said bar being configured for being pulled away from said housing whereby unraveling said fence roll.

11. A magnetized decorative fence assembly comprising:

a plurality of post magnets linearly arranged along a length of a fence post, each of said post magnets being circular, each of said post magnets having a center, said center of each of said post magnets having a hole, said hole being configured for holding a screw, said screw being configured for retaining each of said post magnets to the fence post;

a housing, said housing having a plurality of walls, said plurality of walls being in a hexagon shape, said hexagon shape of said plurality of walls defining an interior, said interior being configured for holding a variety of elements, said housing having an opening, said opening being configured for providing access to said interior of said housing;

a plurality of housing magnets, said plurality of housing magnets being linearly arranged along a length a wall of said plurality of walls such that each of said housing magnets has an outward face exposed on the wall of the plurality of walls, said plurality of housing magnets being configured for engaging by magnetism to said plurality of post magnets;

a fence roll, said fence roll being a rectangular fencing enwrapped in a center of said housing, said center of said housing being a pole having a spring, said spring being a retractable mechanism, said retractable mechanism being configured for retracting said fence roll within said interior of said housing, said fence roll having an end, said end of said fence roll being configured for being pulled out from said housing through a second wall of said plurality of walls wherein the second wall is adjacent to the wall into which the plurality of housing magnets is inset whereby exposing a surface of said fence roll, said surface of said fence roll having a variety of decorative illustrations; and a bar, said bar being a cylindrical shape, said bar being coupled to said end of said fence roll, said bar being positioned in said opening of said housing when in a closed position, said bar having a plurality of hooks, said plurality of hooks being configured for latching to a plurality of screws of said fence post, said bar being configured for being pulled away from said housing whereby unraveling said fence roll.

* * * * *